US012617441B2

(12) United States Patent
Nunez

(10) Patent No.: US 12,617,441 B2
(45) Date of Patent: May 5, 2026

(54) STORAGE TRANSPORT APPARATUS

(71) Applicant: Marco Nunez, Cherry Hill, NJ (US)

(72) Inventor: Marco Nunez, Cherry Hill, NJ (US)

( * ) Notice: Subject to any disclaimer, the term of this patent is extended or adjusted under 35 U.S.C. 154(b) by 619 days.

(21) Appl. No.: 17/803,712

(22) Filed: Oct. 24, 2022

(65) Prior Publication Data

US 2023/0135369 A1 May 4, 2023

Related U.S. Application Data

(60) Provisional application No. 63/360,788, filed on Oct. 28, 2021.

(51) Int. Cl.
*B62B 5/06* (2006.01)
*B62B 1/22* (2006.01)

(52) U.S. Cl.
CPC .................. *B62B 1/22* (2013.01); *B62B 5/06* (2013.01); *B62B 2204/06* (2013.01); *B62B 2501/065* (2013.01)

(58) Field of Classification Search
CPC . B62B 2301/25; B62B 2301/252; B62B 1/18; B62B 5/06; A45C 5/141
See application file for complete search history.

(56) References Cited

U.S. PATENT DOCUMENTS 1,538,550 A * 5/1925 Hamilton ............... A01B 29/02
172/350
1,924,644 A * 8/1933 Himmelberger ....... A01B 29/02
180/19.1

2,580,084 A * 12/1951 Donnelly ............... A01B 29/02
172/350
2,843,414 A * 7/1958 Findiesen ............... B65G 7/10
294/4
3,301,358 A * 1/1967 Rubens ................... A45C 5/00
190/22

(Continued)

*Primary Examiner* — Katy M Ebner
(74) *Attorney, Agent, or Firm* — Armand M. Vozzo, Jr.

(57) ABSTRACT

A storage transport apparatus is disclosed that includes a single wheel member and a main frame. An outer shell of the single wheel member comprises a pair of shell members secured to a central member, which has a pair of pin structures internally secured at diametrically opposite ends and extending at least towards the inner shell. An inner shell of the single wheel member comprises a pair of shell bearing members positioned at diametrically opposite ends, each being rotatably secured to inner member of a corresponding pin structure extended towards the inner shell. The inner shell is formed and configured to fit within the outer shell, the outer boundary of the inner shell preferably conforming in shape with the inner boundary of the outer shell, proximally tracing the contour of the inner boundary of the outer shell. The inner shell and the outer shell are hollow in construction, with the inner shell further including a lid configured to open and close for storing a plurality of items for transportation. The inner shell is disposed within the outer shell and adapted to remain upright when the outer shell rolls in a circular motion along a ground surface. The main frame comprises a handle and is rotatably engaged with the single wheel member. Each end member of the main frame comprises a corresponding frame bearing member, and extends inwardly to rotatably engage with corresponding pin structure of the central member.

28 Claims, 7 Drawing Sheets

(56)          References Cited

U.S. PATENT DOCUMENTS

| | | | | |
|---|---|---|---|---|
| 9,409,583 | B1 * | 8/2016 | Bors | B62B 1/12 |
| 11,161,534 | B1 * | 11/2021 | Trnovec | A45C 5/14 |
| 2008/0265536 | A1 * | 10/2008 | Hume | B62B 1/16 |
| | | | | 280/47.23 |
| 2009/0057083 | A1 * | 3/2009 | Serrano | A45C 13/262 |
| | | | | 190/115 |
| 2019/0159559 | A1 * | 5/2019 | Tachikawa | A45C 5/08 |
| 2020/0385038 | A1 * | 12/2020 | McAleenan | B62B 5/067 |
| 2023/0106897 | A1 * | 4/2023 | McMillan | F25D 3/06 |
| | | | | 280/839 |

* cited by examiner

10B

12

14

58

100B

50

10C

STORAGE TRANSPORT APPARATUS

CROSS-REFERENCE TO RELATED APPLICATION

This application claims the benefit of U.S. Provisional Application Ser. No. 63/360,788 filed Oct. 28, 2021 for a Storage Transport Apparatus.

FIELD OF THE DISCLOSURE

The present invention relates to utility carts for moving articles held thereon, and more specifically, to a storage transport apparatus having a single wheel member.

BACKGROUND OF THE INVENTION

People look forward to a variety of recreational activities to relax, rejuvenate, and make their leisure time more interesting and enjoyable. However, many of such recreational activities require various accessory items to be brought along so that one can further enhance the experience of that particular recreational activity and enjoy to the fullest.

One of the most popular recreational activities is spending a day with family and/or friends at the beach. Basking in the sun, swimming for hours and enjoying the outdoors, a day spent beside the water can help ease the stresses of daily life and can leave one tanned and well rested. Avid beach goers need to pack all sorts of accessory items, such as towels, paperback books, extra dry clothes, umbrellas, coolers filled with food and drinks, suntan lotion, while families with children also must pack an arsenal of toys, skin boards, buckets, and shovels in order to keep their tots happy and engaged. Additionally, most beach goers find it necessary to carry along a large blanket and one or two beach chairs before heading off to the beach. These items are particularly useful in that they provide them comfortable spot to sit back and enjoy the sun's rays, as well as an area free of sand or debris on which belongings can be neatly stored. However, the burden of transporting all of these accessory items to the beach from the car to a particular spot on the sand and at the same time, ensuring that none of such items is damaged in anyway, can quickly become a time consuming and frustrating task. Trekking across hot sand and making multiple trips to the car in order to transport heavy accessory items, such as coolers, blankets, boogie boards, skin boards, toys, and beach chairs, all while trying to keep an eye on the tots and unattended goods on the beach, can leave one feeling exhausted before the day's activities have even begun. Furthermore, after spending long hours soaking up the sun, riding the waves and swimming, packing up the heavy accessory items and dragging them back to the car is the last thing most people want to do.

A set of existing prior art solutions accomplish the task of transporting the accessory items by using bags and backpacks. However, in such bags and bag packs, the accessory items may not be conveniently stored in an organized manner. Accordingly, the user is prevented from gaining a quick access to any one of these accessory items when required, as the user has to resort to rooting through this common hodgepodge collection until the particular desired accessory item is found. Such a lack of organized storage may also lead to an increased chances of damaging or even breaking fragile accessory items. Consequently, the user has an additional task of cleaning or disinfecting the bags or the bag packs.

Another set of existing prior art solutions accomplish the task of transporting the accessory items by using manual transport apparatuses, such as dollies, utility carts, or hand carts. However, such transport apparatuses do not always roll easily over soft sandy terrain and thus, attempting to manually steer a loaded transport apparatus across sand, pebbles or gravel can be extremely difficult. In most of such manual transport apparatuses, large wheels and broad footprints add to the overall size of the apparatus itself, making it bulky and difficult to handle.

Motorized transport apparatuses may help the user to save on their efforts of steering the load from the car to the desired spot and vice versa. However, such motorized transport apparatuses are often very high on the cost factor. Further, due to added weight of the motor in addition to the load of the accessory items may cause the tires, that already have insufficient surface area, sink into the soft sand.

In spite of these various prior art alternatives, there remains a continuing need for improved storage transportation in a mobile form of apparatus that can move a variety of stored articles more easily and efficiently over different terrains with varied surfaces. All patent applications cited throughout this application are incorporated by reference in their entireties for all purposes.

SUMMARY OF THE PRESENT INVENTION

Accordingly, it is a general purpose and object of the present invention to provide an improved storage transport apparatus capable of moving a variety of stored articles held thereon from place to place on land with ease and maneuverability despite the surface of the terrain.

A more particular object of the present invention is to provide an improved storage transport apparatus especially capable of moving its stored articles with ease of effort upon softer terrains and sandy beach surfaces.

Another object of the present invention is to provide an improved storage transport apparatus having an articulated structure that can be made compact when not in use and capable of being deployed when needed for transporting its stored articles.

A still further object of the present invention is to provide an improved storage transport apparatus that is easy to use and durable in its construction.

These and other objects of the present invention are accomplished by a storage transport apparatus comprising a single wheel member rotatably engaged with a main frame. The single wheel member has an inner shell and an outer shell. The outer shell comprises a pair of shell members secured to a central member, with the pair of shell members of the outer shell being secured to the central member using one or more fastening mechanisms. The central member has a pair of pin structures internally secured at diametrically opposite ends and extending at least towards the inner shell. The inner shell is formed and configured to fit within the outer shell, the inner shell having an outer boundary preferably conforming with the inner shape and contour of the outer shell. The inner shell comprises a pair of shell-bearing members positioned at being rotatably secured to the inner side of a corresponding pin structure extended towards the inner shell. The main frame includes a handle and rotatably engaged with the single wheel member. Each end member of the main frame comprises a corresponding frame bearing member, each end member extending inwardly to rotatably engage with a corresponding pin structure of the central member. In a further aspect of the present invention, the inner shell and the outer shell are hollow in construction, with the inner shell further including a lid configured to open and close for storing a plurality of items for transportation. The inner shell is disposed within the outer shell and adapted to remain upright when the outer shell rolls in a circular motion along a ground surface. The outer shell is configured to protect the inner shell and the plurality of items stored in the inner shell while being rolled along the ground surface for the transportation.

Further in accordance with the present invention, the main frame comprises a plurality of holders open in their construction and configured to hold additional items for the transportation. The handle of the main frame is designed to be pivotally anchored to ground for stabilization when the storage transport apparatus is not in motion. The outer members of the pin structures disposed within the central member respectively engage with the end members of the main frame external to the outer wall of the central member with the end members of the main frame being engaged with the outer members of the pin structures within two walls of the central member. The pin structures extended into the inner shell are configured to hold the inner shell such that rolling motion of the outer shell is free from any friction induced by the inner shell.

In a further aspect of the present embodiment, the pair of shell members of the outer shell have a plurality of indentations that provides gripping points for a user to disengage one or both of the pair of shell members from the central member. The inner and the outer shells are designed to be insulated to maintain temperature of a plurality of items stored in the inner shell.

In another aspect of the present invention, the main frame defines a continuous handle between a pair of spaced-apart longitudinal arm portions with the end members of the main frame extending inwards along a first axis. The first axis is distant from and parallel to a longitudinal second axis of the continuous handle. The pin structures disposed internally within the central member are permanently secured at the diametrically opposite ends along the first axis of the main frame. The pair of spaced-apart longitudinal arm portions extend parallelly with respect to each other towards the handle when the length of the handle is made equal to diameter of the central member. When the length of the handle is made less than diameter of the central member, the pair of spaced-apart longitudinal arm portions extend non-parallelly with respect to each other towards the handle. In accordance with a present embodiment, the main frame further defines a crossbar having a crossbar axis parallel to the longitudinal axis of the continuous handle and disposed between the first axis and the longitudinal axis of the continuous handle. With respect to the first axis, the crossbar is disposed at a distance that exceeds radial length of the single wheel. One or more additional storage units may be mounted on the crossbar using one or more fastening mechanisms.

In accordance with an embodiment of the present invention, the main frame comprises a continuous first frame member that proximally traces a contour of an outer boundary of the outer shell across the pin structures. The main frame is a hollow structure fabricated from one of a tubular metal or a synthetic plastic polymer. End members of the main frame extend inwards along a first axis that coincides with an axis of the pin structures. The main frame further comprises a second frame member with a longitudinal second axis orthogonal to the first axis. A proximal end of the second frame member is permanently secured to the circumferential center of the first frame member. A distal end of the second frame member defines the handle extending downwardly with respect to longitudinal axis of the second frame member. The second frame member comprises one or more of an arm member, a pole or a holder to hold additional items for the transportation.

In accordance with alternate embodiments, a shape of the single wheel member is one of a spherical shape, an elongated oval shape, or a lateral cylindrical shape. In each respective embodiment, the inner and the outer shells of the single wheel member are fabricated from synthetic plastic polymer. In accordance with a preferred embodiment, the pair of shell members are symmetric with respect to each other such that the central member is arranged at the middle of the single wheel. The pair of symmetric shell members and the central member form a regular shape. In accordance with an alternate embodiment, the pair of shell members are non-symmetric with respect to each other such that the central member is arranged towards one side of the single wheel. The pair of non-symmetric shell members and the central member form a regular shape.

For a better understanding of these and other aspect of the present invention, reference should be made to the following detailed description taken in conjunction with the accompanying drawing figures in which like reference numerals and characters designate like parts throughout.

BRIEF DESCRIPTION OF THE DRAWINGS

For a fuller understanding of the nature and objects of the present invention, references in the detailed description set forth below shall be made to the accompanying drawings in which.

DETAILED DESCRIPTION OF INVENTION

Figure 1A:
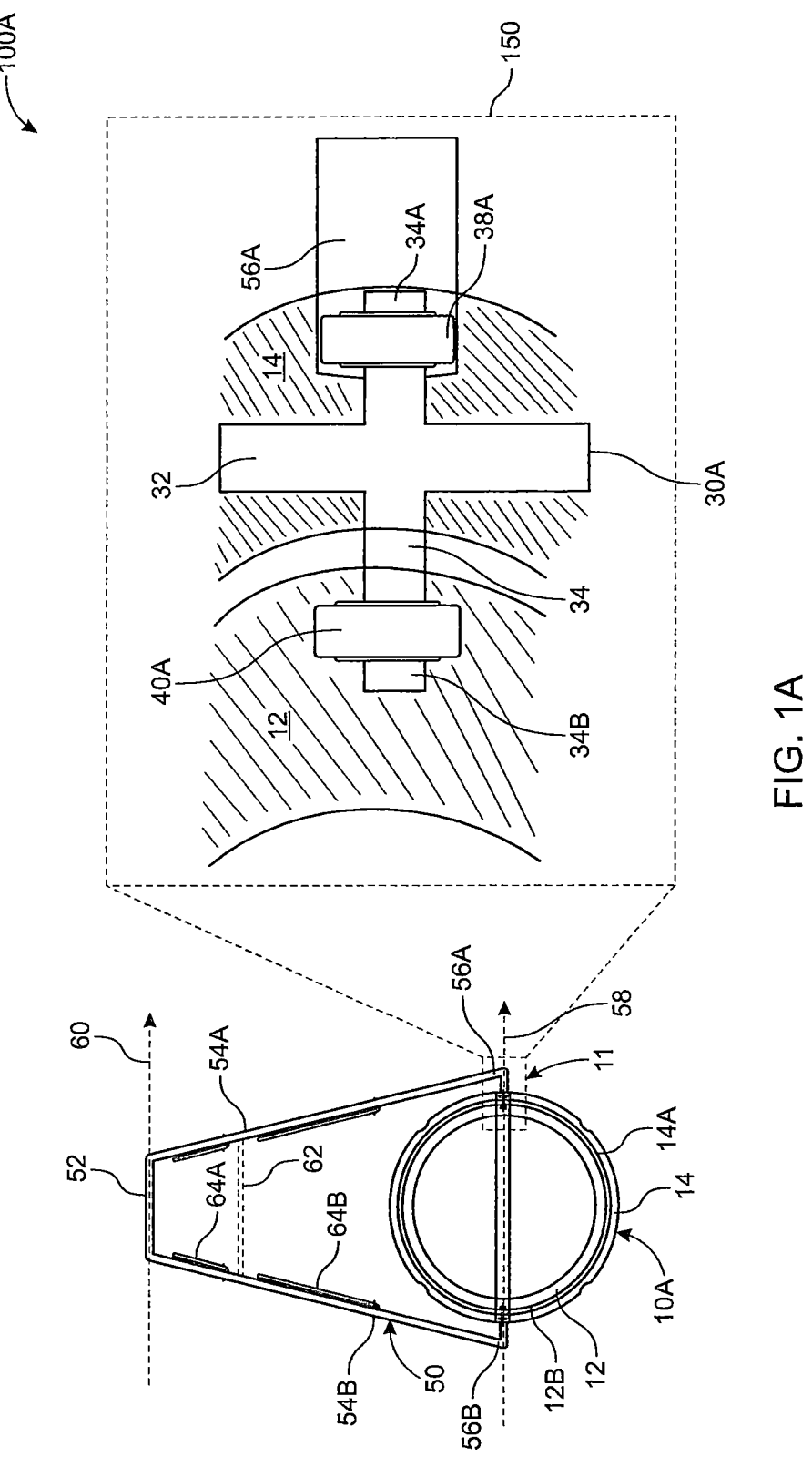
FIGS. 1A, 1B, and 1C depict different perspective views of a first storage transport apparatus and its components, in accordance with an embodiment of the present invention.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be also understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be further understood that the elements, components, regions, layers and sections depicted in the figures are not necessarily drawn to scale.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the. terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

Figures 1B, 1C:
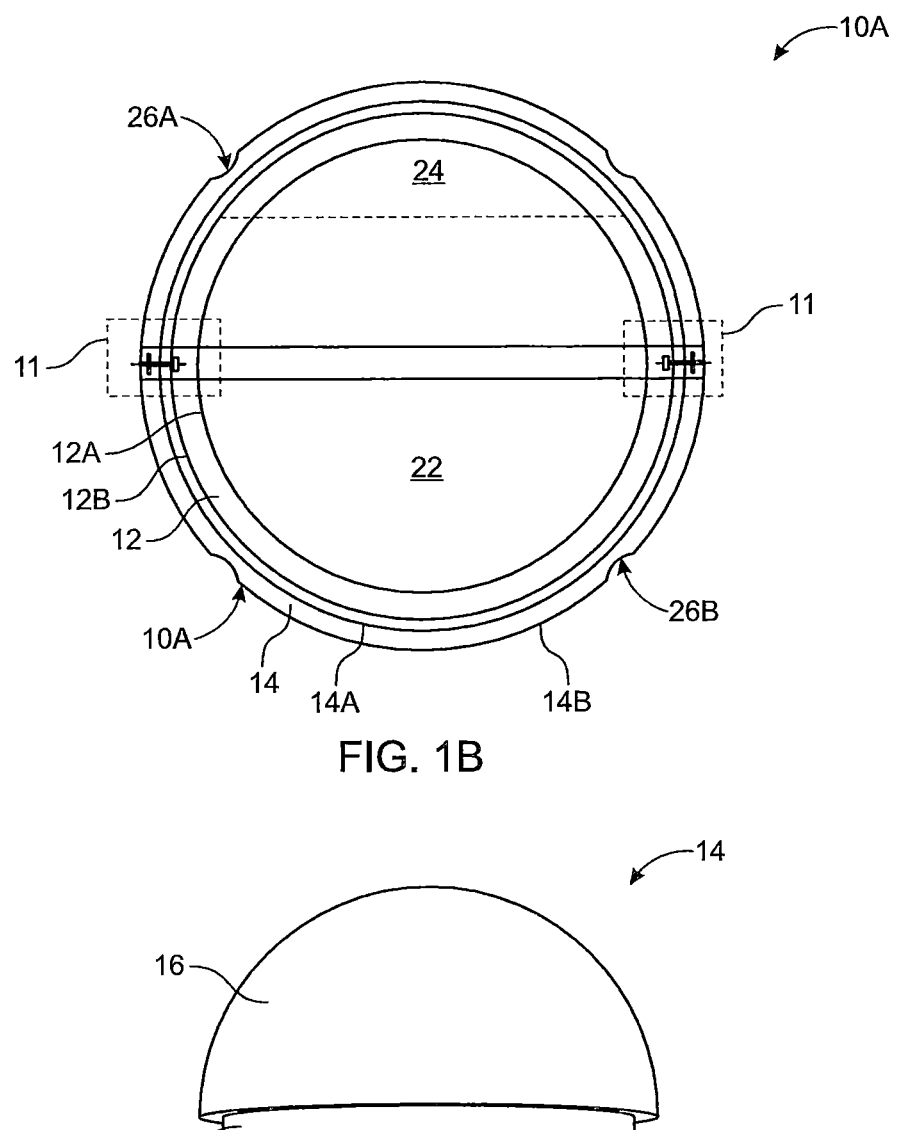
Figure 2:
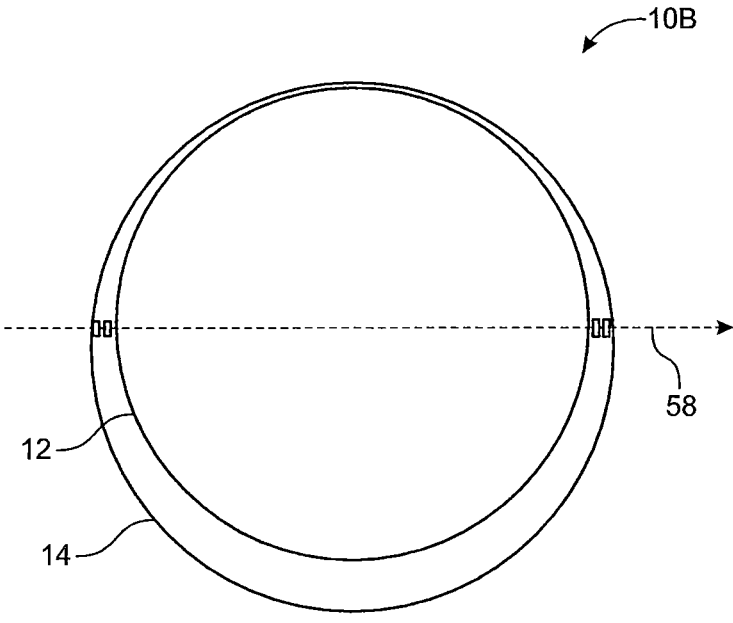
FIG. 2 depicts a side view of an exemplary single wheel member used in accordance with an embodiment of the present invention.
Figure 3A:
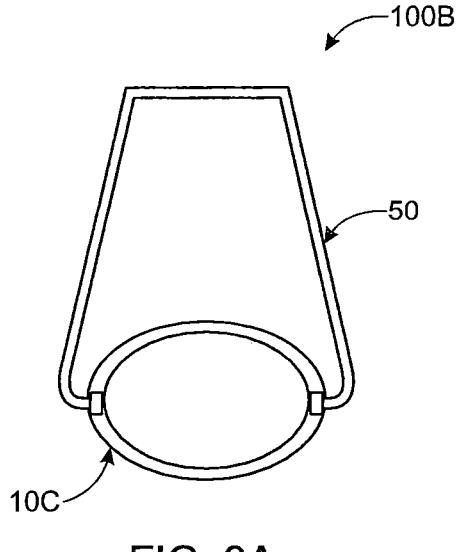
FIG. 3A depicts a side view of a second storage transport apparatus, in accordance with an embodiment of the present invention.
Figure 3B:
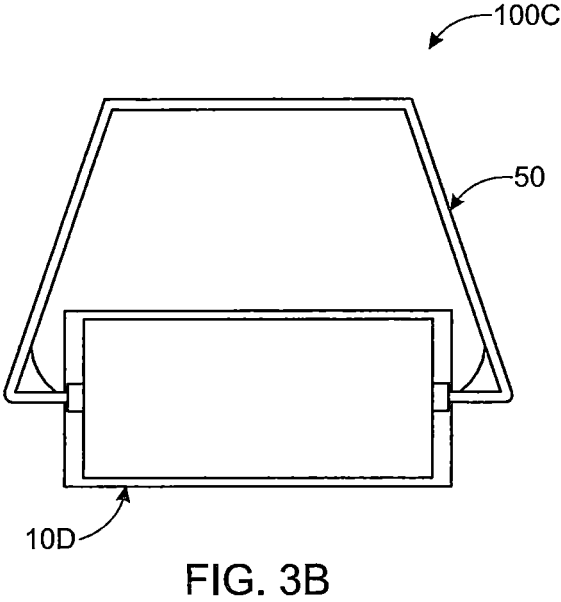
FIG. 3B depicts a side view of a third storage transport apparatus, in accordance with an embodiment of the present invention.
Figure 3C:
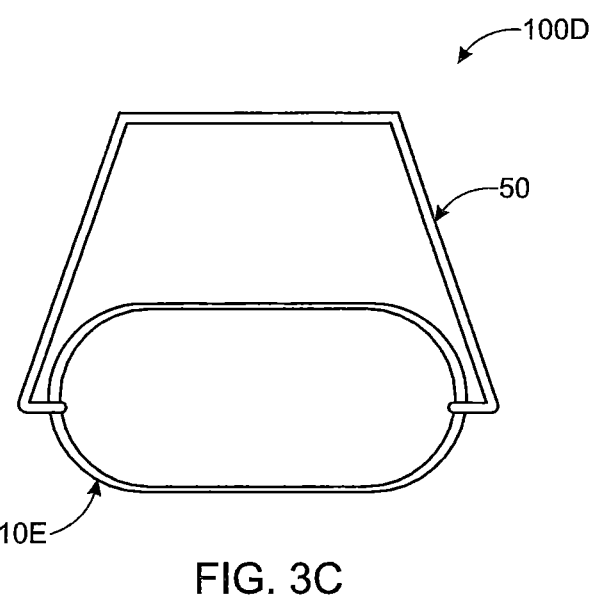
FIG. 3C depicts a side view of a fourth storage transport apparatus, in accordance with an embodiment of the present invention.

In FIGS. 1A, 1B, and 1C, each depict different perspective views of a first storage transport apparatus and its components, in accordance with an embodiment of the present invention. FIG. 2 depicts a side view of an exemplary single wheel member, in accordance with an embodiment of the present disclosure. FIG. 3A depicts a side view of a second storage transport apparatus, in accordance with an embodiment of the present disclosure. FIG. 3B depicts a side view of a third storage transport apparatus, in accordance with an embodiment of the present disclosure. FIG. 3C depicts a side view of a fourth storage transport apparatus, in accordance with an embodiment of the present disclosure. FIG. 1A is described in conjunction with FIGS. 1B, 1C, 2, 3A, 3B, 3C.

Turning to the FIGS. 1A, 1B, IC, and FIG. 2, a first storage transport apparatus 100A and its components constructed and assembled in accordance with the present invention are depicted in different perspectives. As depicted in FIG. 1A, there is shown the first storage transport apparatus 100A that comprises a single wheel member 10A and a main frame 50. The single wheel member 10A and the main frame 50 may be coupled to each other via a pin and bearing assembly 11 on both the diametrically opposite sides of the single wheel member 10A. One side of the pin and bearing assembly 11, as depicted as the exploded diagram 150, includes a first pin structure 30A from a pair of pin structures 30 and a first shell bearing member 40A from a pair of shell bearing members 40. The opposite side of the pin and bearing assembly 11, not shown in FIG. 1A for the sake of brevity, includes a second pin structure 30A from the pair of pin structures 30 and a second first shell bearing member 40B from the pair of shell bearing members 40.

The single wheel member 10A, that may be also referred to as the single wheel body, is the main section of the first storage transport apparatus 100A. When being pulled or pushed by a user via the main frame 50, the entire single wheel member 10A rolls in a circular motion with the intention of making it much easier to move across unstable or soft ground, in this case, the beach sand.

Figure 3D:
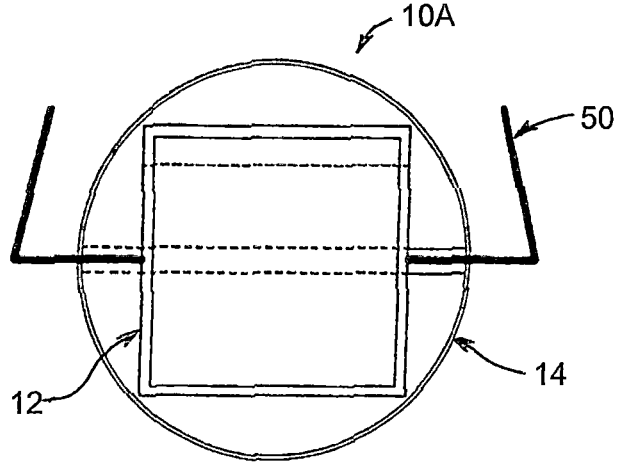
FIG. 3D depicts a side view of an alternative embodiment of the single wheel member of the present storage transport apparatus containing a rectangular or cubic inner shell.
Figure 3E:
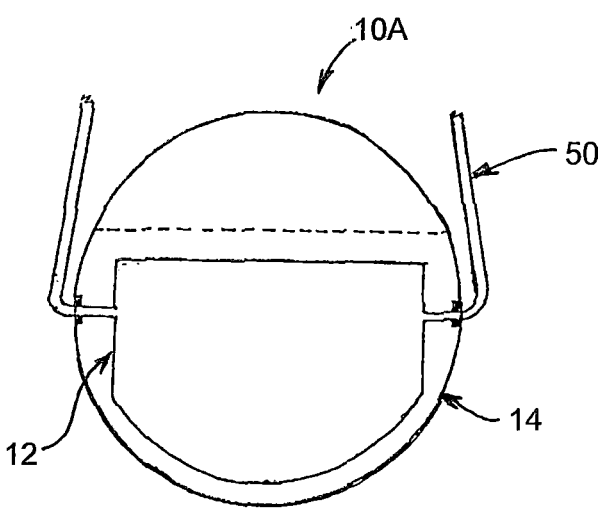
FIG. 3E depicts a side view of a further alternative of the single wheel member of the present invention containing an inner shell in the form of a truncated sphere.

The single wheel member 10A has an inner shell 12 and an outer shell 14 that are solid shells having inner and outer walls or boundaries. As depicted in FIG. 1B in detail, the inner shell 12 has an inner boundary 12A and an outer boundary 12B. Similarly, the outer shell 14 also has an inner boundary 14A and an outer boundary 14B. The inner shell 12 is formed and configured to fit within the outer shell 14, the outer boundary 12B preferably conforming in shape with the inner boundary 14A of the outer shell, proximally tracing the contour of the inner boundary 14A of the outer shell 14. The inner shell 12 may be designed to conform with the contour of the inner boundary 14A of the outer shell 14 but not be touching the inner boundary of the outer shell in any way. Such a design and arrangement of the inner shell 12 within the outer shell 14 results in formation of an air gap or space between the inner shell and the outer shell. Also, such an arrangement helps the outer shell 14 to experience a rolling motion that is free from any friction induced by the inner shell 12. As presented in the alternative embodiments of the single wheel member 10A depicted in FIGS. 3D and 3E, the inner shell 12 may be rectangular or cubic in form, such as that of a rectangular prism or cuboid, or be formed in the shape of a truncated sphere.

In accordance with an embodiment of the present invention, the inner shell 12 and the outer shell 14 may be made hollow in their respective structural forms. Such a hollow structure may provide the outer shell 14 the capability to accommodate the inner shell 12 therein thereby enveloping all or part of the inner shell 12 and providing protection thereto. Similarly, the hollow items while the outer shell 14 is being rolled along the ground surface during the transportation. In an exemplary scenario, the first storage transport apparatus 100A may correspond to a beach cart that may be rolled along the soft sand terrain on a beach. In such an exemplary scenario, various examples of the plurality of items may include, for example, towels, paperback books, extra dry clothes, umbrellas, coolers filled with food and drinks, suntan lotion, toys, skin boards, buckets, and shovels, and the like. It may be noted that the first storage transport apparatus 100A may correspond to a different utility cart that may be used in a different terrain with a different plurality of items, without deviation from the scope of the present invention.

With reference to FIG. 1C, in accordance with an embodiment of the present invention, the outer shell 14 includes a pair of shell members, i.e., a top shell member 16 and a bottom shell member 18, in addition to a central shell member 20 that is disposed intermediate of and arranged engage the top shell and bottom shell members at the middle of the outer shell 14. In this arrangement, the top shell member 16 and the bottom shell member 18 of the outer shell 14 may be assembled together and secured to the central member 20 using one or more fastening mechanisms. For exemplary purposes, the top member 16 and the bottom member 18 may have two male connections 16A and 18A, respectively. The central member 20 may have complementary female connections along the interior so that the top member 16 and the bottom member 18 may be fitted into the central member 20 securing the complete outer shell 14 together. However, the disclosure may not be limited to the above example, and many other fastening mechanisms may be possible, without deviation from the scope of the present invention.

As depicted more clearly in FIG. 1B, the pair of shell members of the outer shell 14 of singled wheel member 10A, namely, the top shell member 16 and the bottom shell member 18, may have a plurality of indentations 26A and 26B respectively formed on the outer boundary 14B of the outer shell. In one case, the plurality of indentations 26A and 26B provide gripping points for a user to engage the top member 16 and the bottom member 18 respectively, with the central member 20. In another case, the gripping points provided by the plurality of indentations 26A and 26B facilitates the user to disengage the top member 16 and the bottom member 18 respectively, from the central member 20.

Further, the inner shell 12 includes a lower body 22 and an upper body 24, with the upper body 24 being formed and configured to open and close as a lid to the inner shell for storing a plurality of items for transportation. The inner shell 12 may be adapted to open by unscrewing or unlatching the upper body 24 to place or access items stored inside. The inner shell 12 may be further adapted to close by screwing or latching the upper body 24 to store the items inside during transportation. In implementation of the present storage transport apparatus 100A, the inner shell 12 remains upright when the outer shell 14 rolls in a circular motion along a ground surface, such as a soft sand terrain, during the transportation. The pair of shell bearing members 40 stationed inside the wall of the inner shell 12 allows the inner shell 12 to stay in the upright position and not be affected by the rolling motion of the outer shell 14.

In accordance with the present embodiment, the inner shell 12 and the outer shell 14 are hollow in their respective constructions and may be insulated to maintain temperature of the plurality of items stored in the inner shell 12. The walls of the lower body 22 of the inner shell 12 along with those of the upper body 24 (i.e., the lid of the inner shell 12) and the outer shell 14 may be provided with insulating material and have water-proof surfaces adapted to receive ice or other coolant material along with beverages, food items and the like, which may be retained in a cold and fresh condition for consumption whenever desired by the user. In an exemplary use case, the inner shell 12 and the outer shell 14 may be fabricated from a synthetic plastic polymer, such as polyvinyl chloride (PVC). In other exemplary use cases, the inner shell 12 and the outer shell 14 may be fabricated from other such materials that are durable, strong, and light-weight.

With reference to FIG. 1A, in accordance with a preferred embodiment of the present invention, the pair of shell members, i.e. the top member 16 and the bottom member 18, may be symmetric with respect to each other such that the central member 20 is arranged at the middle of the single wheel member 10A. In such an embodiment, the diametric axes of both the inner shell 12 and the outer shell 14 coincide with a first axis 58 along which the end members 56A and 56B of the main frame 50 extend inwards. The pair of symmetric shell members, i.e. the top member 16 and the bottom member 18, and the central member 20 form a regular shape, such as a sphere, as is depicted in FIG. 1A.

With reference to FIG. 2, in accordance with an alternate embodiment of the invention, there is shown an exemplary single wheel member 10B. The pair of shell members, i.e. the top member 16 and the bottom member 18, may be non-symmetric with respect to each other such that the central member 20 is arranged towards one side, such as top side, of the outer shell 14 of the single wheel member 10B. In such an embodiment, the diametric axis of the inner shell 12 coincides with the first axis 58 along which the end members 56A and 56B of the main frame 50 extend inwards. However, the diametric axis of the outer shell 14 does not coincide with the diametric axis of the inner shell 12 and the first axis 58. The pair of non-symmetric shell members, i.e. the top member 16 and the bottom member 18, and the central member 20 form a regular shape, such as a sphere, as depicted in FIG. 2.

In accordance with another preferred embodiment of the present invention, a shape of the single wheel member 10A may be a spherical shape, as depicted in FIG. 1A. Notwithstanding, the disclosure may not be limited, and the shape of single wheel member 10A may be of an elongated oval single wheel member 10C (as depicted in a second storage transport apparatus 100B in FIG. 3A), a lateral cylindrical single wheel member 10D with regular edges (as depicted in a third storage transport apparatus 100C in FIG. 3B), or a lateral cylindrical single wheel member 10E with rounded edges (as depicted in a fourth transport apparatus 100D in FIG. 1C), without deviating from the scope of the disclosure.

With reference to FIG. 1A, the central member 20 has a pair of pin structures 30, such as a first pin structure 30A (shown in FIG. 1A) and a second pin structure 10B (not shown in FIG. 1A), internally secured at diametrically opposite ends of the outer shell 14, along the first axis 58. As depicted in the exploded diagram 150, the first pin structure 30A may include a central portion 32, which may be of any flat shape, such as circular, oval, rectangular, or a square. The central portion 32 may provide resistance to the inward or outward movement to the first pin structure 10A so that due to any push or pull, the first pin structure 30A is not dislocated from the intended position. The first pin structure 30A may further include a lateral portion 34, orthogonal to the central portion 32, with an outer member 34A and an inner member 34B. The lateral portion 34 may be cylindrical in shape so that a rotational circular movement of mounted bearings, such as a shell bearing member and a frame member, is facilitated.

In accordance with a preferred embodiment of the present invention, as depicted in FIG. 1A, outer members of the pair of pin structures 30 do not extend outwards from outer wall of the central member 20. For example, the outer member 34A of the first pin structure 30A extends towards the outer wall of the central member 20, however the outer member 34A does not protrude out of the outer wall of the central member 20. The inner member 34B protrudes out of the inner wall of the central member 20 in the opposite direction and extends towards the inner shell 12. The inner member 34B may be adapted to be inserted into the body of the inner shell 12 from the outer boundary 12B of the inner shell 12 along the first axis 58. Further in accordance with the present embodiment, the pair of pin structures 30 extended into the inner shell 12 may be configured to hold the inner shell 12 such that rolling motion of the outer shell 14 is free from any friction induced by the inner shell 12. For the sake of brevity, only the structure of the first pin structure 30A is described herein. It may be noted that the structure of the second pin structure 30B is exactly similar to the structure of the first pin structure 30A.

In accordance with the present invention, the inner shell 12 comprises a pair of shell bearing members 40, such as a first shell bearing member 40A (shown in FIG. 1A) and a second shell bearing member 40B (not shown in FIG. 1A), positioned at diametrically opposite ends, along the first axis 58. The longitudinal axis of the pair of shell bearing members 40 overlaps with the diametric axis of the inner shell 12. The outer circular surface of each of the pair of shell bearing members 40 may be affixed within the body of the inner shell 12 by means of, for example, adhesive. The inner circular surface of each of the pair of shell bearing members 40 may be adapted to be mounted on a respective inner member of corresponding pin structure. Thus, each of the pair of shell bearing members 40 is rotatably secured to inner member of a corresponding pin structure extended towards the inner shell 12. For example, the first shell bearing member 40A may be rotatably secured to the inner member 34B of the first pin structure 30A that is extended towards the inner shell 12. For the sake of brevity, only the first shell bearing member 40A rotatably secured to the inner member 34B of the first pin structure 30A is depicted and described herein. It may be noted that the second shell bearing member 40B may also be rotatably secured to the inner member of the second pin structure 30B extended towards the inner shell 12 from the diametrically opposite direction in the similar manner.

When the outer members of the pair of pin structures 30 do not extend outwards from outer wall of the central member 20, end members 56A and 56B of the main frame 50 are engaged with the outer members of the pair of pin structures 30 within two walls of the central member 20, via a first frame bearing member 38A (shown in FIG. 1A) and a second frame bearing member 38B (not shown in FIG. 1A). The first frame bearing member 38A and the second frame bearing member 38B may be secured and affixed inside the end members 56A and 56B respectively, of the main frame 50.

In accordance with an embodiment, not depicted in FIG. 1A, outer members of the pair of pin structures 30 extend outwards from outer wall of the central member 20. For example, the outer member 34A of the first pin structure 30A extends towards the outer wall of the central member 20 and protrudes out of the outer wall of the central member 20. The end members 56A and 56B of the main frame 50 are engaged with the outer members of the pair of pin structures 30 external to the outer wall of the central member 20, via the first frame bearing member 38A and the second frame bearing member 38B, respectively.

Thus, to summarize, the main frame 50 and the single wheel member 10A connects with the pair of pin structures 30, such as metal pins, that are stationed inside the side walls of the outer shell 14 and the inner shell 12. For example, the first pin structure 30A may run through the outer member 34A and the inner member 34B and the first shell bearing member 40A. The main purpose of the first shell bearing member 40A stationed on the inside the wall of the inner shell 12 allows the inner shell 12 to stay in an upright position and not be affected by the rolling motion of the outer shell 14. The first pin structure 30A also holds the inner shell 12 up so that there is no friction between the inner shell 12 and the outer shell 14. The first frame bearing member 38A is stationed inside of the end of the main frame 50 which is inserted in the side of the outer shell 14 allows the main frame 50 to pull or push the first storage transport apparatus 100A and allow the outer shell 14 to roll from one location to another.

The main frame 50 includes a handle 52 and is rotatably engaged with the single wheel member 10A. Each end member, such as the end members 56A and 56B, of the main frame 50 comprises a corresponding frame bearing member, such as the first frame bearing member 38A and the second frame bearing member 38B. Each end member, such as the end members 56A and 56B, may extend inwardly to rotatably engage with a corresponding pin structure of the central member 20 along the first axis 58. In accordance with an embodiment, the main frame 50 may be light-weight, durable, and strong so that the user can easily push or pull the first storage transport apparatus IOOA. The main frame 50 may be a hollow structure fabricated from one of a tubular metal (such as aluminum) or a synthetic plastic polymer.

In accordance with an exemplary embodiment, the main frame 50 may define the continuous handle 52 between a pair of spaced-apart longitudinal arm portions 54A and 54B. The end members 56A and 56B of the main frame 50 extend inwards along the first axis 58. The first axis 58 is distant from and parallel to a longitudinal axis 60 of the continuous handle 52. The pair of pin structures 30 internally are permanently secured within the walls of the central member 20 at the diametrically opposite ends, along the first axis 58.

The pair of spaced-apart longitudinal arm portions 54A and 54B may extend parallelly with respect to each other towards the handle 52, with the length of the handle 52 being equal to diameter of the central member 20. Alternatively, the pair of spaced-apart longitudinal arm portions 54A and 54B may converge while extending towards the handle 52. In this alternative case, the pair of spaced-apart longitudinal arm portions 54A and 54B extend non-parallelly with respect to each other towards the handle 52, with the length of the handle 52 being less than diameter of the central member 20. In accordance with alternate embodiments of the present invention, the corners of spaced-apart longitudinal arm portions 54A and 54B may be rounded or angled.

Figures 4A, 4B:
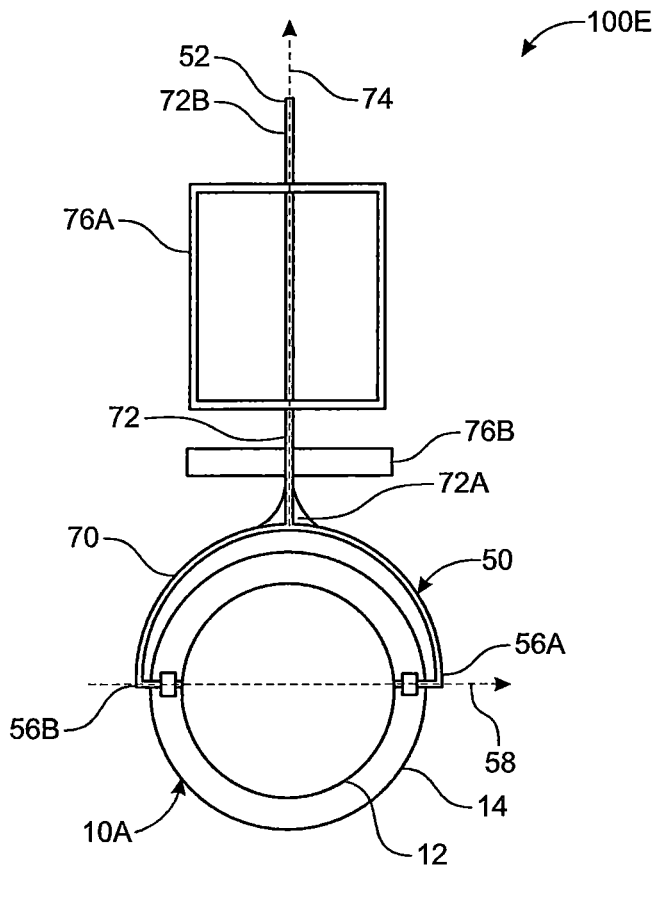
FIG. 4A depicts a top view of a fifth storage transport apparatus, in accordance with an embodiment of the present invention.
FIG. 4B depicts a handle of main frame of the fifth storage transport apparatus, in accordance with an embodiment of the present invention.

In accordance with an exemplary embodiment of the present invention, the main frame 50 comprises a plurality of deployable holders, such as a first set of holders 64A and a second set of holders 64B seen in FIG. 1A, which when deployed and opened, are configured to hold additional items for the transportation. In accordance with another embodiment, when not in use, the plurality of holders may be closed. In an alternate embodiment, the handle 52 of the main frame 50 may be extended downwards to be anchored to ground for stabilization when the first storage transport apparatus 100A is not in motion. As a further alternate form of the main frame 50, the first set of holders 64A, as depicted in FIG. 4B, may be anchored to the ground for stabilization.

The main frame 50 may further define a crossbar 62 having a crossbar axis parallel to the longitudinal axis 60 of the continuous handle 52 and disposed between the first axis 58 and the longitudinal axis of the continuous handle. In accordance with this embodiment of the present invention, with respect to the first axis 58, the crossbar 62 may be disposed at a distance that exceeds radial length of the single wheel member 10A. An additional storage unit may be mounted on the crossbar 62 using one or more fastening mechanisms.

Thus, the main frame 50 serves multiple purposes. For example, the main frame 50 may act as the handle 52 for either pulling or pushing the first storage transport apparatus 100A when transporting items to the destination. The handle 52 of the first storage transport apparatus 100A may be designed in such a manner, for example, to have a downward extension 78 (depicted in FIG. 4B), such as to not only allow multiple people to pull or push the first storage transport apparatus 100A, but also allow the user to place the handle 52 down and push in the sand when the destination is reached, thus acting as an anchor for stabilization.

In another example, frame 50 may act as a holder for transporting additional items. It may have poles or arms that may be opened and closed so that items can be held while being transported. Later on, attachments may be sold to extend such section allowing for more items to be carried. The extension may increase the length of the device as well. The design may vary so that it not only acts as a way to pull the first storage transport apparatus 100A, but also be able to carry and/or hang items for transportation.

Turning to FIGS. 4A and 4B, there is depicted a fifth storage transport apparatus 100E, in accordance with an embodiment of the present disclosure. FIG. 4A depicts a top view of the fifth storage transport apparatus 100E and FIG. 4B depicts a handle of the main frame 50 of the fifth storage transport apparatus 100E. According to this embodiment, as depicted in the fifth storage transport apparatus 100E of FIG. 4A, the main frame 50 comprises a continuous first frame member 70 that proximally traces a contour of an outer boundary of the outer shell 14 across the pair of pin structures 30. End members 56A and 56B of the main frame 50 extend inwards along the first axis 58 that coincides with an axis of the pair of pin structures 30. In further accordance with this embodiment, the main frame 50 further comprises a second frame member 72 with a longitudinal second axis 74 orthogonal to the first axis 58. A proximal end 72A of the second frame member 72 is permanently secured to the circumferential center of the first frame member 70. A distal end 72B of the second frame member 72 defines the handle 52 extending downwardly with respect to longitudinal second axis 74 of the second frame member 72. The second frame member 72 comprises holding members, such as arms 76A and a holder 76B, to hold additional items for the transportation.

Figure 5A:
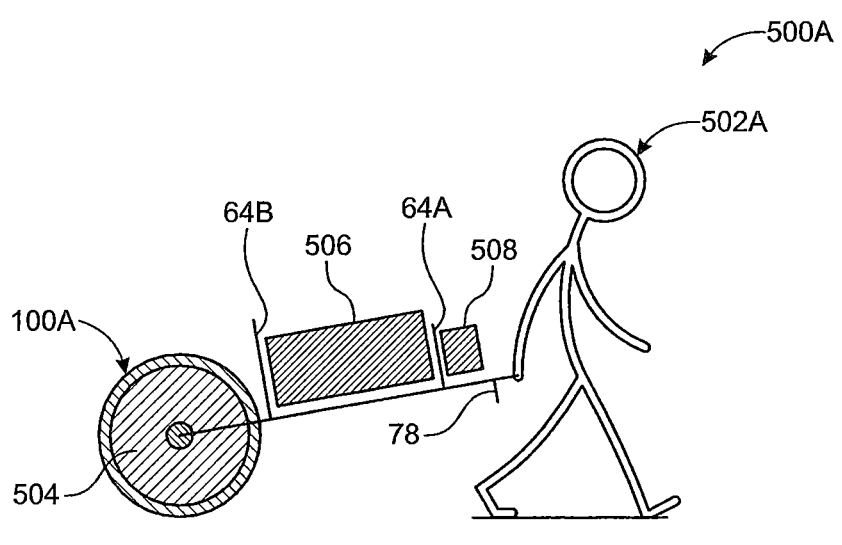
FIGS. 5A and 5B depict two exemplary scenarios in conjunction with implementation of storage transport apparatuses described in FIGS. 1A and 4, respectively, in accordance with various embodiments of the present invention.
Figure 5B:
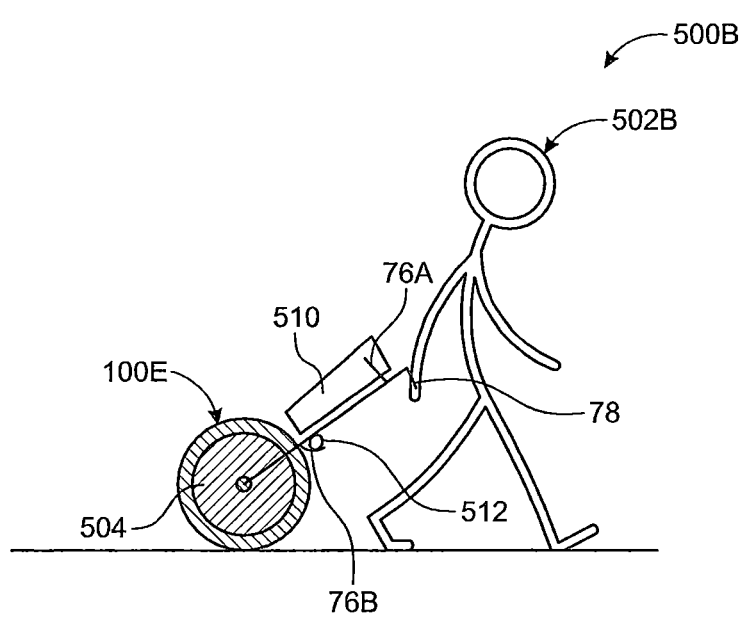

FIGS. 5A and 5B depict two exemplary scenarios 500A and 500B, respectively, in accordance with various embodiments of the present disclosure. The first exemplary scenario 500 is described in conjunction with the first storage transport apparatus 100A described in FIG. 1A. The second exemplary scenario 500B is described in conjunction with the fifth storage transport apparatus 100E described in FIG. 4A.

With reference to the first exemplary scenario 500A depicted in FIG. 5A, there is shown a user 502A who may either pull or push the first storage transport apparatus 100A when transporting the plurality of items along an unstable or soft ground, such as beach sand. Temperature-sensitive items 504, such as beverages and food items, that require a controlled environment may be stored in the inner shell 12. Heavy items 506, such as coolers, blankets, and beach chairs, may be loaded on the second set of holders 64B. Light items 508, such as boogie boards, skin boards, and toys, may be loaded on the first set of holders 64A. In case of absence of additional items, the first set of holders 64A and the second set of holders 64B may be folded back to align along the longitudinal arm portions 54A and 54B. The handle 52 of the first storage transport apparatus 100A may be designed with a downward extension 78 to not only allow multiple people to pull or push the first storage transport apparatus 100A but also allow the use 502A to place the handle 52 down and push the downward extension 78 in the sand, acting as an anchor for stabilization, when the destination is reached.

With reference to the second exemplary scenario 500B depicted in FIG. 5B, there is shown another user 502B who may either pull or push the fifth storage transport apparatus 100E when transporting the plurality of items along an unstable or soft ground, such as beach sand. As described in FIG. 5A, temperature-sensitive items 504, such as beverages and food items, that require a controlled environment may be stored in the inner shell 12. Personal items 510, such as a blanket, a boogie board, a skin board, and the like, may be loaded on the holding member, such as arms 76A. Other items, such as water bottle and charger, may be loaded on the other holding member, such as holder 76B. The handle 52 of the fifth storage transport apparatus 100E may be designed with a downward extension 78 to not only allow the user 502B to pull or push the fifth storage transport apparatus 100E but also allow the user 502B to place the handle 52 down and push the downward extension 78 in the sand, acting as an anchor for stabilization, when the destination is reached.

The exemplary embodiments of the present invention herein described provide for several advantages over the prior art. In contrast to the existing solutions in the prior art, the proposed storage transport apparatus, such as the first storage transport apparatus 100A, the second storage transport apparatus 100B, the third storage transport apparatus 100C, the fourth transport apparatus 100D, and the fifth storage transport apparatus 100E, correspond to a simple and non-motorized storage transport apparatus. Such storage transport apparatuses are easy to pack, store, and transport. Pulling or pushing such storage transport apparatuses along an unstable or soft ground, such as beach sand, is also easy and hassle-free. Various parts of the storage transport apparatus, such as the inner shell 12, and the holding members, such as arms 76A and a holder 76B, provide an ample space for storage and transportation of the plurality of items. The plurality of items may be properly organized making it convenient for the user to gain a quick access to any one of these items when required. Due to proper and organized storage, there may be reduced chances of damaging or even breaking fragile items. Consequently, the user may be prevented from having an additional task of cleaning or decontamination of the apparatus. Further, as compared to motorized transport apparatuses, the proposed storage transport apparatus is cost effective and thus, easy on the user's pocket. As the parts of the proposed storage transport apparatus are minimalistic, the proposed storage transport apparatus is light-weight, maintenance-free, easy to handle, durable, and user-friendly.

Therefore, it is apparent that the present invention in its described embodiments provides an improved storage transport apparatus capable of moving a variety of stored articles held thereon from place to place on land with ease and maneuverability despite the surface of the terrain. More particularly, the present invention provides an improved storage transport apparatus especially capable of moving its stored articles with ease of effort over softer terrains and sandy beach surfaces. In addition, the described invention provides an improved storage transport apparatus having an articulated structure that can be made compact when not in use and capable of being deployed when needed for transporting its stored articles. The present storage transport apparatus, as described in its exemplary embodiments, further provides an improved storage transport apparatus that is easy to use and implement and durable in its construction.

While the invention has been described in terms of exemplary embodiments, it is to be understood that the words that have been used are words of description and not of limitation. As is understood by persons of ordinary skill in the art, a variety of modifications can be made without departing from the scope of the invention as ultimately defined by the appended claims, which should be given their fullest, fair scope. Accordingly, it is understood that the present invention is not limited to any of the exemplary embodiments described, but rather is intended to cover modifications within the spirit and scope of the present invention.

What is claimed is:

1. A storage transport apparatus, comprising:
a single wheel member formed having an inner shell and an outer shell, wherein the outer shell comprises a pair of outer shell members assembled and secured together with a central shell member disposed intermediate of the outer shell members and fitted therebetween at the middle of the outer shell, the central shell member further having a pair of pin and shell bearing assemblies internally secured therein at diametrically opposite ends and extending at least towards the inner shell and into rotatable engagement therewith, wherein the inner shell is formed to fit within the outer shell with a space provided therebetween, and wherein the rotatable engagement of the inner shell provided by the pair of pin and shell bearing assemblies positioned within the central shell member at diametrically opposite ends allows the inner shell to maintain an upright position without being affected by rolling motion of the outer shell; and
a main frame comprising a handle and a pair of end members rotatably engaged with the single wheel member, wherein each end member of the main frame comprises a corresponding frame bearing member, each end member extending inwardly to rotatably engage with a corresponding pin and shell bearing assembly of the central shell member.

2. The storage transport apparatus according to claim 1, wherein the inner shell is formed having an outer boundary substantially conforming with an inner boundary of the outer shell, proximally tracing the contour of the inner boundary of the outer shell.

3. The storage transport apparatus according to claim 1, wherein the inner shell is formed in the shape of a rectangular body or cube.

4. The storage transport apparatus according to claim 1, wherein the inner shell is formed in the shape of a truncated sphere.

5. The storage transport apparatus according to claim 1, wherein the inner shell and the outer shell are hollow shells.

6. The storage transport apparatus according to claim 1, wherein the inner shell further comprises:
a lid configured to open and close for storing a plurality of items for transportation, wherein the inner shell remains upright when the outer shell rolls in a circular motion along a ground surface.

7. The storage transport apparatus according to claim 6, wherein the outer shell is configured to protect the inner shell and the plurality of items stored in the inner shell while being rolled along the ground surface for the transportation.

8. The storage transport apparatus according to claim 7, wherein the main frame comprises a plurality of holders, when opened, are configured to hold additional items for the transportation.

9. The storage transport apparatus according to claim 1, wherein the pair of shell members of the outer shell are secured to the central shell member using one or more fastening mechanisms.

10. The storage transport apparatus according to claim 1, wherein the handle of the main frame is designed to be anchored to ground for stabilization when the storage transport apparatus is not in motion.

11. The storage transport apparatus according to claim 1, wherein outer members of the pin and shell bearing assemblies extend outwards from outer wall of the central shell member, and wherein the end members of the main frame are engaged with the outer members of the pin and shell bearing assemblies external to the outer wall of the central shell member.

12. The storage transport apparatus according to claim 1, wherein outer members of the pin and shell bearing assemblies do not extend outwards from outer wall of the central shell member, and wherein end members of the main frame are engaged with the outer members of the pin and shell bearing assemblies within two walls of the central member.

13. The storage transport apparatus according to claim 1, wherein the pin and shell bearing assemblies extended into the inner shell are configured to hold the inner shell such that rolling motion of the outer shell is free from any friction induced by the inner shell.

14. The storage transport apparatus according to claim 1, wherein the pair of shell members of the outer shell have a plurality of indentations that provides gripping points for a user to disengage one or both of the pair of shell members from the central shell member.

15. The storage transport apparatus according to claim 1, wherein the inner and the outer shells are insulated to maintain temperature of a plurality of items stored in the inner shell.

16. The storage transport apparatus according to claim 1, wherein the main frame defines a continuous handle between a pair of spaced-apart longitudinal arm portions, wherein the end members of the main frame extend inwards along a first axis, wherein the first axis is distant from and parallel to a longitudinal axis of the continuous handle, and wherein the pin structures internally are permanently secured at the diametrically opposite ends along the first axis.

17. The storage transport apparatus according to claim 16, wherein the pair of spaced-apart longitudinal arm portions extend parallelly with respect to each other towards the handle, length of the handle being equal to diameter of the central member.

18. The storage transport apparatus according to claim 16, wherein the pair of spaced-apart longitudinal arm portions extend non-parallelly with respect to each other towards the handle, length of the handle being less than diameter of the central shell member.

19. The storage transport apparatus according to claim 16, wherein the main frame further defines a crossbar having a crossbar axis parallel to the longitudinal axis of the continuous handle and disposed between the first axis and the longitudinal axis of the continuous handle.

20. The storage transport apparatus according to claim 16, wherein, with respect to the first axis, the crossbar is disposed at a distance that exceeds radial length of the single wheel member, and wherein an additional storage unit is mounted on the crossbar using one or more fastening mechanisms.

21. The storage transport apparatus according to claim 1, wherein the main frame comprises a continuous first frame member that proximally traces a contour of an outer boundary of the outer shell across the pin structures, and wherein end members of the main frame extend inwards along a first axis that coincides with an axis of the pin structures.

22. The storage transport apparatus according to claim 18, wherein the main frame further comprises:

a second frame member with a longitudinal second axis orthogonal to the first axis, wherein a proximal end of the second frame member is permanently secured to the circumferential centre of the first frame member, wherein a distal end of the second frame member defines the handle extending downwardly with respect to longitudinal second axis of the second frame member, and wherein the second frame member comprises one or more of an arm, a pole or a holder to hold additional items for the transportation.

23. The storage transport apparatus according to claim 1, wherein a shape of the single wheel member is one of a spherical shape, an elongated oval shape, or a lateral cylindrical shape.

24. The storage transport apparatus according to claim 1, wherein the main frame is a hollow structure fabricated from one of a tubular metal or a synthetic plastic polymer.

25. The storage transport apparatus according to claim 1, wherein the inner and the outer shells are fabricated from synthetic plastic polymer.

26. The storage transport apparatus according to claim 1, wherein the pair of shell members are symmetric with respect to each other such that the central shell member is arranged at the middle of the single wheel member, and wherein the pair of symmetric shell members and the central shell member form a spherical shape.

27. The storage transport apparatus according to claim 1, wherein the pair of shell members are non-symmetric with respect to each other such that the central member is arranged towards one side of the single wheel member, and wherein the pair of non-symmetric shell members and the central member form a regular shape.

28. The storage transport apparatus according to claim 1, wherein each of the pair of pin structures is rotatably secured internally using a main bearing member, and wherein the main bearing member is mounted on corresponding pin member and fixed internally within walls of the central member.

* * * * *